(12) United States Patent
Kim et al.

(10) Patent No.: US 8,316,301 B2
(45) Date of Patent: Nov. 20, 2012

(54) APPARATUS, MEDIUM, AND METHOD SEGMENTING VIDEO SEQUENCES BASED ON TOPIC

(75) Inventors: Jungbae Kim, Yongin-si (KR); Doosun Hwang, Seoul (KR); Jiyeun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1391 days.

(21) Appl. No.: 11/498,857

(22) Filed: Aug. 4, 2006

(65) Prior Publication Data
US 2007/0030391 A1 Feb. 8, 2007

(30) Foreign Application Priority Data
Aug. 4, 2005 (KR) .................. 10-2005-0071507

(51) Int. Cl.
G06F 3/00 (2006.01)
G06K 9/00 (2006.01)
G06K 9/62 (2006.01)

(52) U.S. Cl. ........ 715/723; 715/719; 715/720; 715/721; 382/165; 382/170; 382/225

(58) Field of Classification Search .................. 715/723, 715/719, 720, 721; 725/35; 382/165, 170, 382/225
See application file for complete search history.

(56) References Cited

U.S. PATENT DOCUMENTS

| | | | | |
|---|---|---|---|---|
| 5,821,945 A * | 10/1998 | Yeo et al. | ........................ | 345/440 |
| 6,072,542 A | 6/2000 | Wilcox et al. | | |
| 6,438,165 B2 * | 8/2002 | Normile | ........................ | 375/240 |
| 6,493,042 B1 | 12/2002 | Boxdagi et al. | | |
| 6,602,297 B1 * | 8/2003 | Song | ........................ | 715/210 |
| 6,711,587 B1 * | 3/2004 | Dufaux | ........................ | 707/999.104 |
| 6,724,933 B1 | 4/2004 | Lin et al. | | |
| 2002/0102024 A1 * | 8/2002 | Jones et al. | ........................ | 382/225 |
| 2002/0146168 A1 * | 10/2002 | Lee et al. | ........................ | 382/165 |
| 2003/0030752 A1 * | 2/2003 | Begeja et al. | ........................ | 348/563 |
| 2004/0008789 A1 * | 1/2004 | Divakaran et al. | ........................ | 375/240.26 |
| 2004/0143434 A1 | 7/2004 | Divakaran et al. | | |
| 2006/0064716 A1 * | 3/2006 | Sull et al. | ........................ | 725/37 |
| 2006/0090179 A1 * | 4/2006 | Hsu et al. | ........................ | 725/17 |
| 2006/0103736 A1 * | 5/2006 | Obrador | ........................ | 348/222.1 |
| 2006/0173916 A1 * | 8/2006 | Verbeck Sibley et al. | . | 707/104.1 |

FOREIGN PATENT DOCUMENTS
KR         10-0438269         6/2004

* cited by examiner

*Primary Examiner* — Haoshian Shih
(74) *Attorney, Agent, or Firm* — Staas & Halsey LLP (57) ABSTRACT

Provided are an apparatus, medium, and method segmenting video sequences based on a topic. The apparatus may include a start-shot determination unit detecting a plurality of key-frames by using character information from video sequences including a plurality of frames to determine the detected key-frames as start-shots for each topic, and a topic list creation unit creating a topic list by using the start-shots for each topic.

21 Claims, 10 Drawing Sheets

| HDD | |
|---|---|
| [image] | Advertisement1.mph |
| | VJ_REPORTERS.mpg ▷ |
| | Drama1.mpg |
| TITLE : VJ_REPORTERS<br>CHANNEL : KBS2<br>BROADCASTING TIME :<br>    4/1 PM 9:55<br>    - 4/1 PM 11:05<br>GENRE : CURRENT AFFAIRS<br>/DOCUMENTARY-SOCIETY<br>BROADCASTER :<br>    JUNG-MIN, HWANG | Drama2.mpg ▷ |

(EPG SIGNAL)

APPARATUS, MEDIUM, AND METHOD SEGMENTING VIDEO SEQUENCES BASED ON TOPIC

CROSS-REFERENCE TO RELATED APPLICATIONS

This application claims the benefit of Korean Patent Application No. 10-2005-0071507, filed on Aug. 4, 2005, in the Korean Intellectual Property Office, the disclosure of which is incorporated herein in its entirety by reference

BACKGROUND OF THE INVENTION

1. Field of the Invention

An embodiment of the present invention relates to segmentation of video sequences, and more particularly, to an apparatus, medium, and method segmenting video sequences based on a topic at high speed by detecting main characters.

2. Description of the Related Art

Developments in digital signal processing techniques such as video and audio compression have allowed users to retrieve and browse desired multimedia content at desired points in time. Fundamental techniques required to browse and retrieve non-linear multimedia content include shot segmentation and shot clustering, with these two techniques being most important for structurally and hierarchically analyzing multimedia content.

A "shot" in a video program is a sequence of frames that can be obtained from a video camera without interruption, and may functions as a basic unit for analyzing or organizing the video program. The shot may mean a single frame or a plurality of frames, however, for simplicity of explanation, the term shot will be exemplified by the single frame, noting that embodiments of the invention are not limited to the same. In addition, a "scene" in the video program is a semantic element of a video construction or development of a story, and includes a collection of shots related to one another by the same semantic context. The concept of the shot or the scene may be similarly applied to an audio program as well as the video program.

A multimedia indexing technique allows users to easily browse or retrieve a desired part of the video program. A conventional multimedia indexing technique may include extracting organizational information of video content in units of shots or scenes, extracting main characteristic elements such as key-frames capable of representing a corresponding segment for each organizational unit, indexing the organizational information for multimedia content, and describing semantic information, such as an occurrence of an event, advent of visual or auditory objects, and conditions and backgrounds of objects, along a temporal axis.

However, such conventional multimedia content indexing techniques fail to easily identify the result of a summarization because excessive segments are generated when segmentation is performed on the basis of scene change. In addition, conventional techniques fail to accurately detect start points of the segments because the multimedia content is not segmented on the basis of similarity of content, but rather, the multimedia content is summarized using a single piece of information such as similarity of colors. Further, it is difficult to summarize the multimedia content when a broadcast type or genre is changed because only a characteristic of a particular genre is used. Moreover, due to an excessive processing load generated during the summarization of the multimedia content, it is difficult to apply conventional techniques to embedded systems such as mobile phones, personal digital assistants (PDAs), and digital cameras, which have low performance processors.

SUMMARY OF THE INVENTION

An embodiment of the present invention provides an apparatus, medium, and method for segmenting video sequences based on a topic, at high speed, based on the detection of main characters.

Additional aspects and/or advantages of the invention will be set forth in part in the description which follows and, in part, will be apparent from the description, or may be learned by practice of the invention.

To achieve the above and/or other aspects and advantages, embodiments of the present invention include an apparatus topic based segmenting a video program, the apparatus including a start-shot determination unit to detect a plurality of key-frames based on character information from video sequences including a plurality of frames to determine the detected key-frames as start-shots for each topic, and a topic list creation unit to create a topic list based on the start-shots for each topic.

The start-shot determination unit may detect key-frames based on clothing information of at least one main character.

The topic list creation unit may organize frames existing between a current topic start-shot and a next topic start-shot into a current topic episode, and add the current topic episode to the start-shot of each topic in the topic list.

Further, the start-shot determination unit may include a pre-processing unit to determine frames belonging to a respective scene by detecting scene change among frames included in the video sequences and to obtain a number of main characters appearing in the video sequences, a face detection unit to detect faces from the determined frames belonging to the respective scene to determine face detection frames, and a key-frame determination unit to cluster the determined face detection frames according to the main characters corresponding to the number of main characters to determine the key-frames.

The pre-processing unit may detect the scene change by calculating similarity between a current frame and a previous frame.

In addition, the pre-processing unit may obtain the number of main characters from an electronic program guide (EPG) signal.

The pre-processing unit may include a thumbnail image creation unit to create thumbnail images for input frames, a scene change detection unit to detect the scene change using similarity of color histograms between thumbnail images of neighboring frames, and a number-of-main-characters determination unit to determine the number of main characters by analyzing an EPG signal.

In addition, the face detection unit may include a thumbnail image re-organization unit to create an integral image for thumbnail images of input frames and to re-organize the thumbnail images using the integral image, a sub-window generation unit to generate a sub-window for the re-organized thumbnail images, and a classifying unit to determining whether the sub-window includes a face.

Here, the face detection unit may divide the thumbnail images of the input frames into a plurality of sections having a section having a highest probability of detecting the face, and sequentially provide the plurality of sections to the thumbnail image re-organization unit in descending order from the section having the highest probability of detecting the face to a section having a lowest probability of detecting the face.

The key-frame determination unit may further include a clothing information extraction unit to extract clothing information from a face detection frame, a character clustering unit to perform a character clustering method based on the extracted clothing information, and a main character determination unit to select a cluster corresponding to the main character from a plurality of clusters, clustered in the character clustering unit, corresponding to the number of main characters and to provide frames included in the selected cluster as key-frames of each topic.

The clothing information may include a clothing color histogram.

To achieve the above and/or other aspects and advantages, embodiments of the present invention include a method of topic based segmenting of video sequences, the method including detecting a plurality of key-frames based on character information from video sequences including a plurality of frames to determine the detected key-frames as start-shots for each topic, and creating a topic list based on the start-shots for each topic.

The determination of the start-shots may include detecting key-frames based on clothing information of at least one main character.

Further, the creation of the topic list may include organizing frames existing between a current topic start-shot and a next topic start-shot into a current topic episode, and adding the current topic episode to the start-shot of each topic in the topic list.

The determination of the start-shots may include detecting a scene change from the frames included in the video sequences to determine frames belonging to a respective scene and obtaining a number of main characters appearing in the video sequences, detecting faces from the determined frames belonging to the respective scene to determine face detection frames, and clustering the determined face detection frames according to the main characters corresponding to the number of main characters to determine the face detection frames as key-frames.

The scene change may be detected by creating thumbnail images of input frames and using similarity of color histograms between thumbnail images of neighboring frames.

In addition, the number of main characters may be obtained by analyzing an electronic program guide (EPG) signal.

The detection of the faces my include creating an integral image for thumbnail images of input frames and re-organizing the thumbnail images using the integral image, generating a sub-window for the re-organized thumbnail images, and determining whether the sub-window includes a face.

The detection of the faces may further include dividing the thumbnail images of the input frames into a plurality of sections including a section having a highest probability of detecting a face, and sequentially providing the thumbnail images for the thumbnail image re-organizing in descending order from the section having the highest probability of detecting the face to a section having a lowest probability of detecting the face.

The determination of the key-frames may include extracting clothing information from the face detection frames, performing a character clustering method based on the extracted clothing information, and selecting a cluster corresponding to the main character from a plurality of clusters corresponding to the number of main characters and providing frames included in the selected cluster as the key-frames of each topic.

To achieve the above and/or other aspects and advantages, embodiments of the present invention include a medium including computer readable code to implement a method of topic based segmenting of video sequences, the method may include detecting a plurality of key-frames based on character information from video sequences including a plurality of frames to determine the detected key-frames as start-shots for each topic, and creating a topic list based on the start-shots for each topic.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
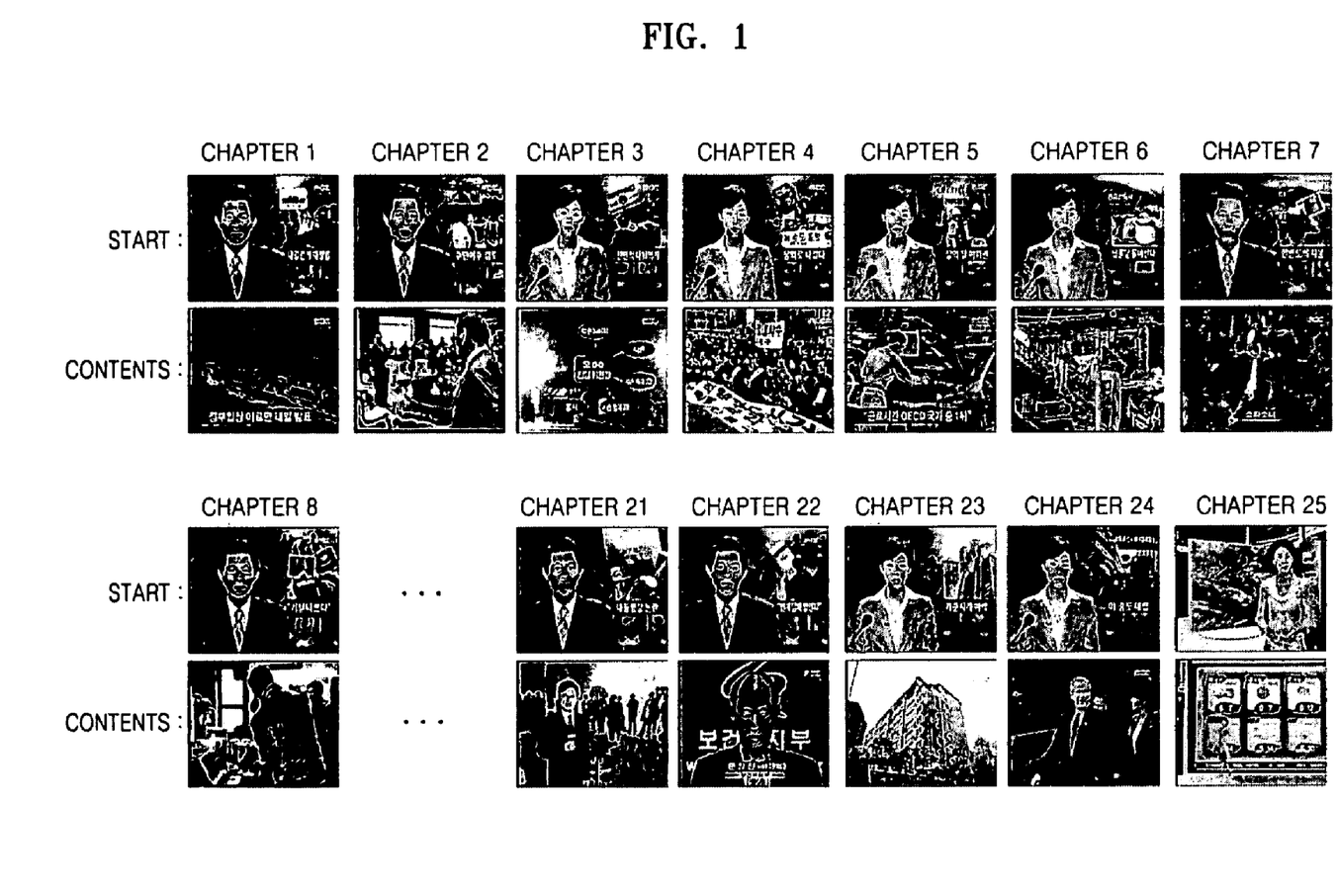
FIG. 1 illustrates an example of topic-based segmentation of video sequences related to news.

FIG. 1 illustrates an example of topic-based segmentation of video sequences related to news. Referring to FIG. 1, Chapters 1 to 25 are segmented based on a topic, whereby each chapter includes a start-shot set as a key-frame having a main character and material frames, e.g., an episode, for supporting corresponding content. Here, though only news has been shown, embodiments of the present invention are equally available for alternate topics in addition to news.

Figure 2:
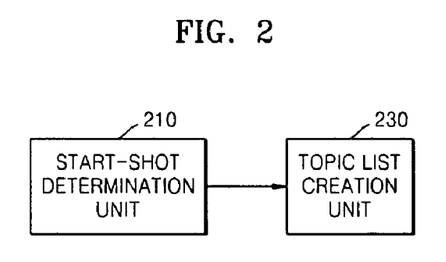
FIG. 2 illustrates an apparatus for segmenting video sequences based on a topic, according to an embodiment of the present invention.

FIG. 2 illustrates an apparatus for segmenting video sequences based on a topic, according to an embodiment of the present invention. Referring to FIG. 2, the apparatus for segmenting video sequences based on a topic may include a start-shot determination unit 210 and a topic list creation unit 230, for example, in order to segment video sequences based on the topic by detecting the main characters.

Referring to FIG. 2, the start-shot determination unit 210 may detect a plurality of key-frames by using character information from video sequences including a plurality of frames to determine the detected key-frames as start-shots for each topic. In one embodiment, a main character may appear in each key frame. In addition, an operation of detecting the start-shot preferably may be performed in units of scenes.

The topic list creation unit 230 may further create a topic list by using the start-shots for each topic determined by the start-shot determination unit 210. The start-shots detected for each scene are combined to create the topic list. In one embodiment, frames existing between a current topic start-shot and a next topic start-shot are made into a current topic episode, and the current topic episode is added to the start-shot of each topic of the topic list.

Figure 3:
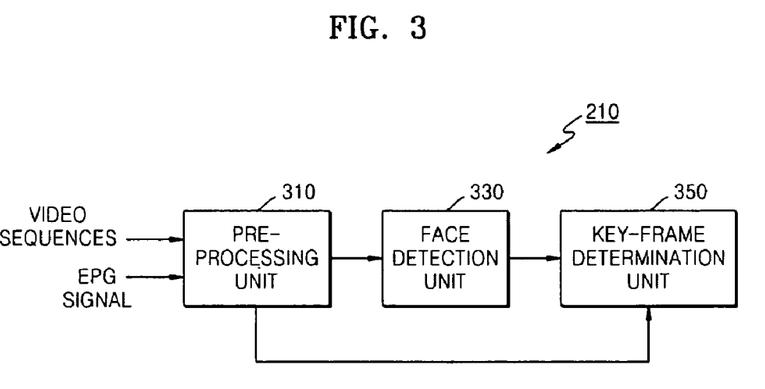
FIG. 3 illustrates a start-shot determination unit, such as that of FIG. 2, according to an embodiment of the present invention.

FIG. 3 illustrates a make up of a start-shot determination unit 210, such as that of FIG. 2, according to an embodiment of the present invention. The start-shot determination unit 210 may include a pre-processing unit 310, a face detection unit 330, and a key-frame determination unit 350, for example.

Figure 4A:
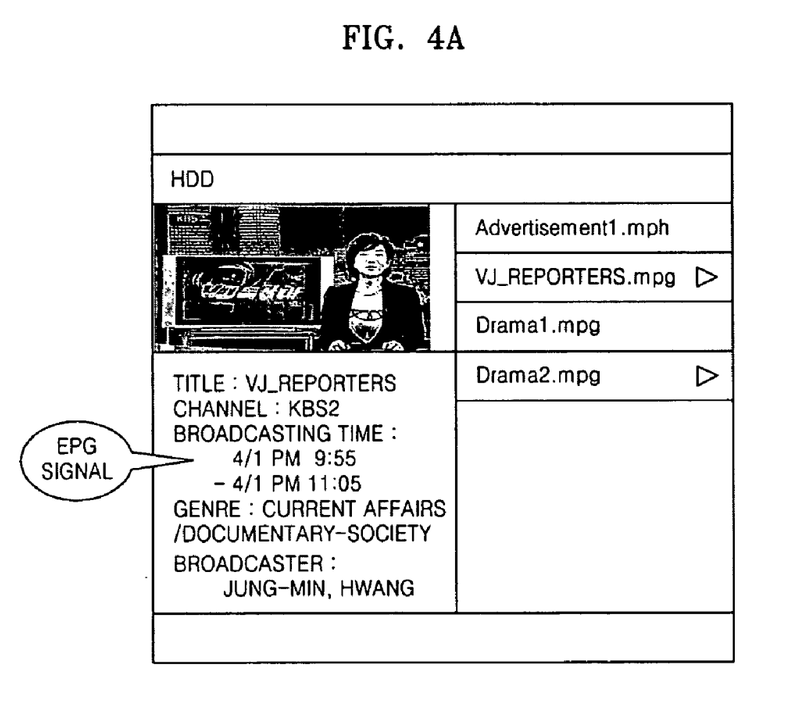
FIGS. 4A to 4C illustrate an operation of each element of a start-shot determination unit, such as that of FIG. 3, according to an embodiment of the present invention.

Referring to FIG. 3, the pre-processing unit 310 may receive video sequences making up one video program and detect scene changes to determine frames belonging to a current scene. In addition, the pre-processing unit 310 may receive an electronic program guide (EPG) signal of a corresponding video program and determines the number of main characters. As shown in FIG. 4A, the EPG signal may include various kinds of information such as broadcasting time, program genre, title, name of a director, names of characters, plot, etc.

The face detection unit 330 may detect faces in each of the frames belonging to the current scene, e.g., as determined by the pre-processing unit 310. Since the main characters may look to the front, front faces may be detected. In this case, only whether a face exists may be determined, for example, regardless of the number of faces in each frame. Here, a variety of well-known face detection algorithms may be employed to detect faces.

Figure 4B:
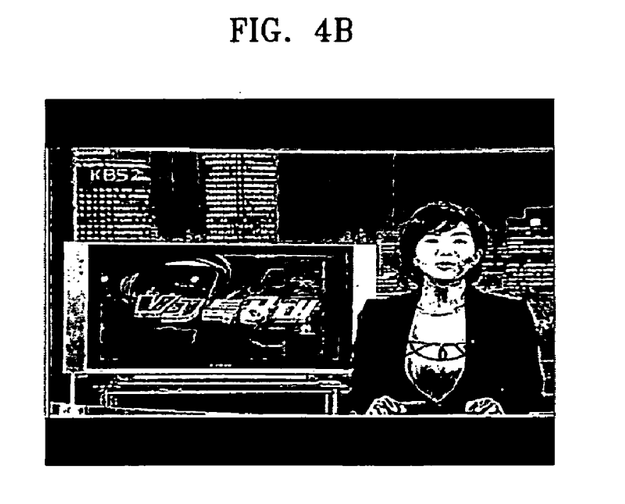
Figure 4C:
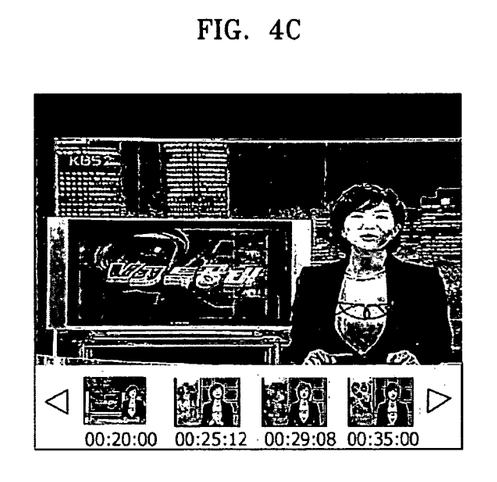

The key-frame determination unit 350 may detect clothing information from the frames in which faces have been detected, e.g., in the face detection unit 330, cluster frames for each character corresponding to the clothing information, and determine frames including the main character as the key-frames, e.g., start-shots of a corresponding topic. Since the clothing information of a main character seldom changes in a single video program, the clothing information may be used in a character clustering method. Clusters having relatively few frames may also be removed from a plurality of clusters generated as a result of the clustering, in consideration with a determined number of main characters, e.g., as determined in the pre-processing unit 310, assuming that the main characters appear more frequently compared to other characters. The key frame determination unit 350, thus, may determine the result of the character clustering, for example, the key-frames of FIG. 4B, and use the key-frames to create a topic list as shown in FIG. 4C.

Figure 5:
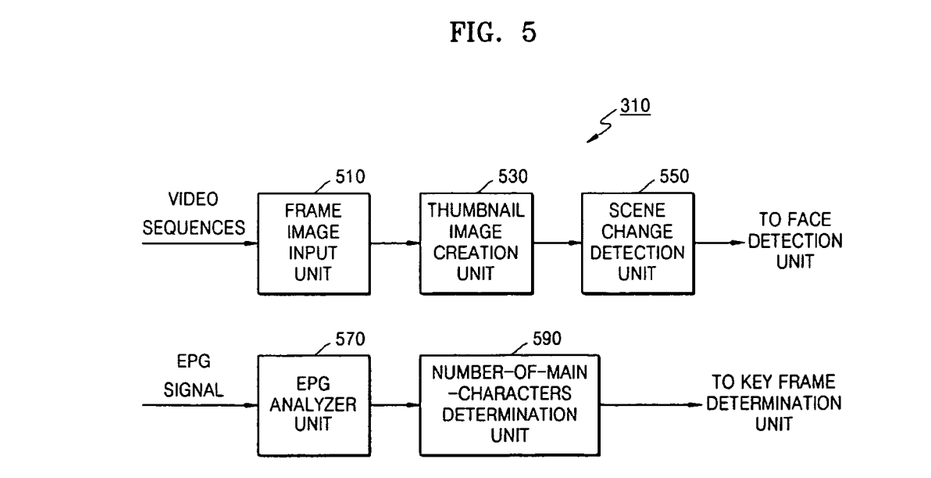
FIG. 5 illustrates a pre-processing unit of a start-shot determination unit, such as that of FIG. 3, according to an embodiment of the present invention.

FIG. 5 illustrates a make up of a pre-processing unit 310 of a start-shot determination unit 210, such as that of FIG. 3, according to an embodiment of the present invention. The pre-processing unit 310 may include a frame input unit 510, a thumbnail image creation unit 530, a scene change detection unit 550, an EPG analyzing unit 570, and a number-of-main-characters determination unit 590, for example.

Referring to FIG. 5, the frame input unit 510 may sequentially receive frame images detected from the video sequences.

The thumbnail image creation unit 530 may sample pixels with a constant interval for original frame images provided from the frame input unit 510 in a size of W×H to create thumbnail images having a reduced size of w×h. These thumbnail images allow the face detection unit 330 to detect faces at a higher speed in comparison with when the original frame images are used.

The scene change detection unit 550 may store previous frame images and calculate similarity of color histograms between two successive frame images, e.g., between a current frame image and the previous frame image. When the calculated similarity is lower than a predetermined threshold value, it may be determined that a scene change is detected in the current frame. In this case, the similarity Sim(Ht, Ht+1) may be calculated from the below Equation 1, for example.

$$Sim(H_t, H_{t+1}) = \sum_{n=1}^{N} \min[H_t(n), H_{t+1}(n)], \qquad \text{Equation 1}$$

Here, Ht corresponds to a color histogram of the previous frame image, Ht+1 corresponds to a color histogram of the current frame image, and N corresponds to a histogram level.

The EPG analyzing unit 570 may analyze an EPG signal included in a single video program, and the number-of-main-characters determination unit 590 may determine the number of main characters based on the result of the analysis in the EPG analyzing unit 570.

Figure 6A:
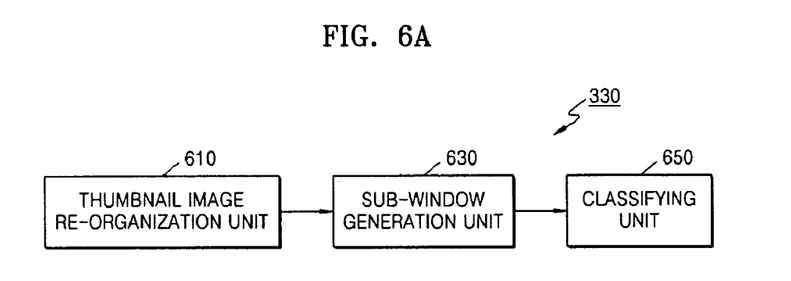
FIG. 6A illustrates a face detection unit of a start-shot determination unit, such as that of FIG. 3, according to an embodiment of the present invention.

FIG. 6A illustrates a detailed make up of a face detection unit 330 of a start-shot determination unit 210, such as that of FIG. 3, according to an embodiment of the present invention. The face detection unit 330 may include a thumbnail image re-organization unit 610, a sub-window generation unit 630, and a classifying unit 650, for example.

Referring to FIG. 6A, the thumbnail re-organization unit 610 may obtain integral images at each point from the thumbnail images for the frames belonging to the current scene, e.g., as provided by the pre-processing unit 310, to re-organize a thumbnail image. A method of obtaining the integral images will be further described below in greater detail with reference to FIG. 6B.

Figure 6B:
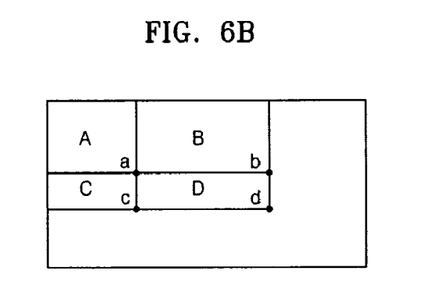
FIG. 6B illustrates a method of organizing an integral image, according to an embodiment of the present invention.

Referring to FIG. 6B, the thumbnail image may include four regions A, B, C, and D, and four points a, b, c, and d, specified according to an embodiment of the present invention. An integral image of a point a refers to a sum of pixel values in a region on an upper left side of the point a. That is, the integral image of the point a corresponds to a sum of pixel values in the region A. In this case, each of the pixel values may include a luminance level of a pixel, for example. In addition, an integral square image of the point a refers to a sum of squared pixel values in the region on the upper left side of the point a. That is, the integral square image at the point a corresponds to a sum of squared pixel values included in the region A. This concept of such an integral image allows convenient calculation of the sum of the pixel values in any region of an image. In addition, use of such an integral image allows for fast segmentation in the segmentation unit 670. For example, the sum of the pixel values of the region D may be calculated from the below Equation 2, for example.

$$S(D)=ii(d)-ii(b)-ii(c)+ii(a) \quad \text{Equation 2}$$

Here, ii(d) corresponds to the integral image of the point d, ii(b) corresponds to the integral image of the point b, ii(c) corresponds to the integral image of the point c, and ii(a) corresponds to the integral image of the point a.

The thumbnail image re-organization unit 610 may reorganize the thumbnail images using integral images at each point, as calculated from Equation 2, for example. In one embodiment, the inclusion of the thumbnail re-organization unit 610 may be optional.

Figure 7:
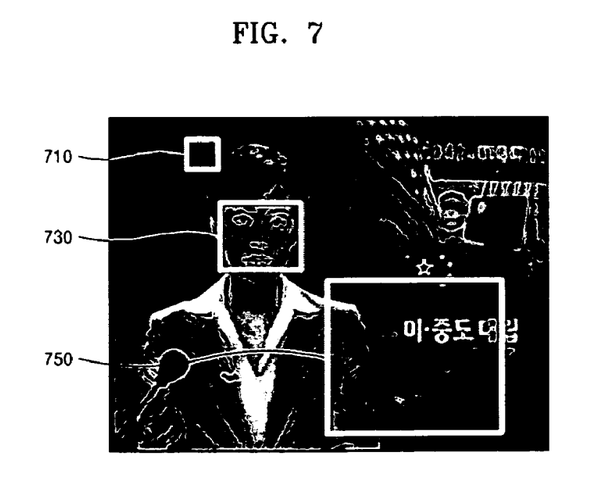
FIG. 7 illustrates an example of a sub-window used in a face detection unit of a start-shot determination unit, such as that of FIG. 3, according to an embodiment of the present invention.

The sub-window generation unit 630 may generate sub-windows by dividing the re-organized thumbnail images, e.g., as re-organized in the thumbnail image re-organization unit 610. In one embodiment, the size of the sub-window may be previously determined and may be linearly enlarged by a predetermined ratio. For example, the size of the sub-window may be initially set to 20×20 pixels, and the entire image may be divided using the sub-window having the above initial size. Then the size of the sub-window may be linearly enlarged by a ratio of 1:2, and the entire image may be divided again using the sub-window having the enlarged size. The image may be divided by enlarging the size of the sub-window until the size of the sub-window becomes equal to the size of the entire image. The sub-windows generated in the sub-window generation unit 630 may be superposed with one another, for example. Reference numerals 710, 730, and 750 of FIG. 7 further illustrate examples of sub-windows generated by the sub-window generation unit 630.

The classifying unit 650 may be implemented by n stages S1 to Sn, which may further be cascaded. Each of the stages S1 to Sn detects faces using classifiers based on a simple characteristic. The number of classifiers may also increase as the stage number increases. For example, four or five classifiers may be used in the first stage S1, and fifteen to twenty classifiers may be used in the second stage S2, and so on.

Each stage may have a weighted sum for a plurality of classifiers and may determine whether the face has been successfully detected based on the sign of the weighted sum. The sign of the weighted sum of each stage can be expressed by the following Equation 3, for example.

$$H(x) = \text{sign}\left[\sum_{m=1}^{M} c_m \cdot f_m(x)\right], \quad \text{Equation 3}$$

Here, cm corresponds to a weighting value of a classifier; and fm(x) corresponds to an output of a classifier. Each classifier has a single simple characteristic and a threshold value. As a result, −1 or +1 is output as the value of fm(x).

In the classifying unit 650, the first stage S1 may receive the k-th sub-window provided from the sub-window generation unit 630 and tries to detect faces. When the face detection fails, the k-th sub-window is determined as a non-face sub-window. Conversely, when the face detection is successful, the k-th sub-window image is provided to the second stage S2. When the face detection is successful in the k-th sub-window of the final stage Sn, the k-th sub-window is determined as a face sub-window. On the other hand, an Adaboost learning algorithm may also be employed in each classifier to select the weighting value. According to the Adaboost algorithm, some important visual characteristics are selected from a large characteristic set to generate a very efficient classifier. Such a cascaded stage structure allows the non-face sub-window to be determined even by using a small number of simple characteristics. Therefore, the non-face sub-window can be directly rejected at initial stages such as the first or second stage, and then the next (k+1)-th sub-window can be received to detect faces. As a result, it is possible to improve a total speed of the face detection process.

Figure 8A:
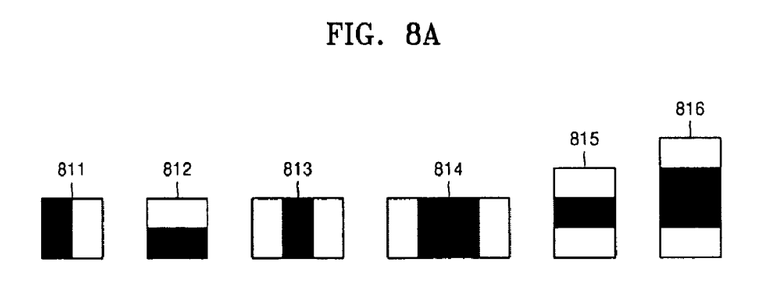
FIGS. 8A and 8B illustrate examples of characteristics used in a classifier of a face detection unit, such as that of FIG. 6A, according to an embodiment of the present invention.
Figure 8B:
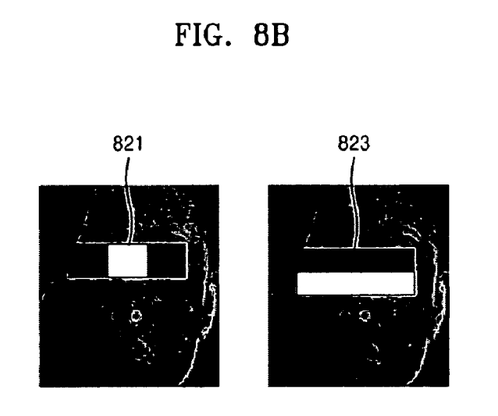

FIG. 8A illustrates edge simple characteristics 811 and 812, and line simple characteristics 813, 814, 815, and 816 used in each classifier of the classifying unit 650, according to an embodiment of the present invention. Each simple characteristic includes two or three rectangular areas having a white or black color. Each classifier subtracts the sum of pixel values of the white rectangular area from the sum of pixel values of the black rectangular area according to the simple characteristics, and the subtraction result is compared with the threshold value corresponding to the simple characteristic. A sign value of −1 or +1 is output depending on the result of the comparison between the subtraction result and the threshold value. FIG. 8B further illustrates an example of eye detection using a line simple characteristic 821 having one white rectangular area and two black rectangular areas or an edge simple characteristic 823 having one white rectangular area and one black rectangular area. When the line simple characteristic is used, the difference of pixel values between an eye region and a nose ridge region of a face is measured taking into consideration that the eye region is darker than the nose ridge region. When the edge simple characteristic is used, the difference of gradations between the eye region and the cheek region of a face is measured taking into consideration that the eye region is darker than the cheek region. As described above, the simple characteristics for detecting the face may be variously provided.

Figure 9:
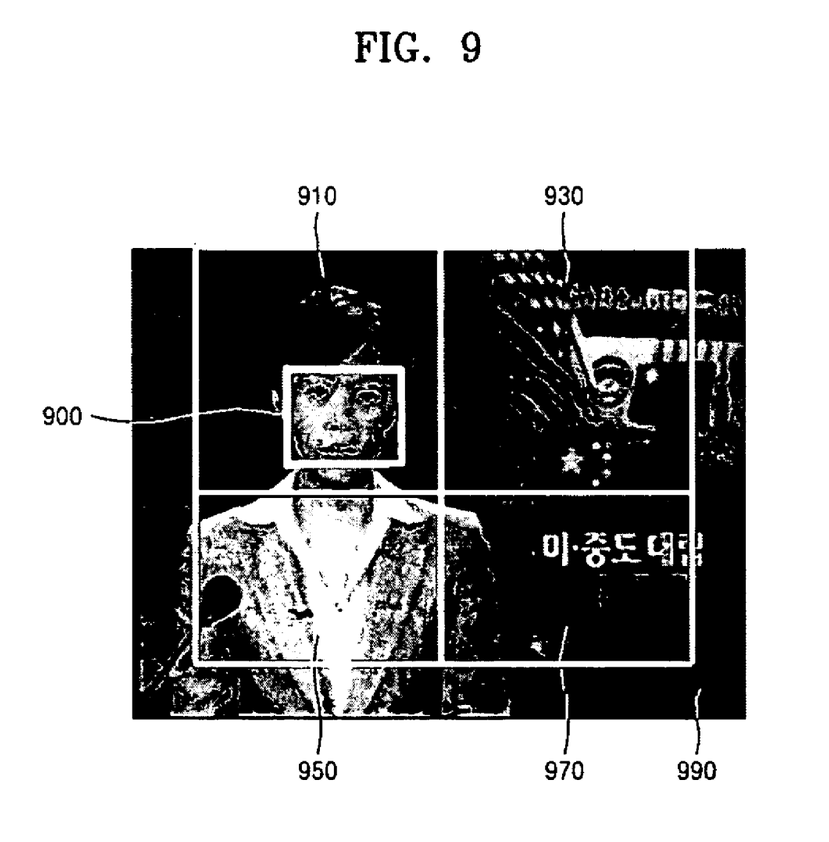
FIG. 9 illustrates an example of frame image segmentation for detecting faces in a face detection unit of a start-shot determination unit, such as that of FIG. 3, according to an embodiment of the present invention.

FIG. 9 illustrates an example of frame image segmentation for detecting faces at high speed using a face detection unit 330 of a start-shot determination unit 210, such as that of FIG. 3, according to an embodiment of the present invention. A frame image may be divided into first to fifth sections 910, 930, 950, 970, and 990 according to a possibility of face existence before the thumbnail images are input to the thumbnail re-organization unit 610. In this case, the segmentation locations for each section may be statistically determined through experiments or simulations, for example. Generally, since the first section 910 has the highest probability of detecting the face 900, the plurality of sections may be sequentially provided to the thumbnail image re-organization unit 610 from the first section 910 of the highest probability to the fifth section 990 of the lowest probability in descending order, for example.

Figure 10A:
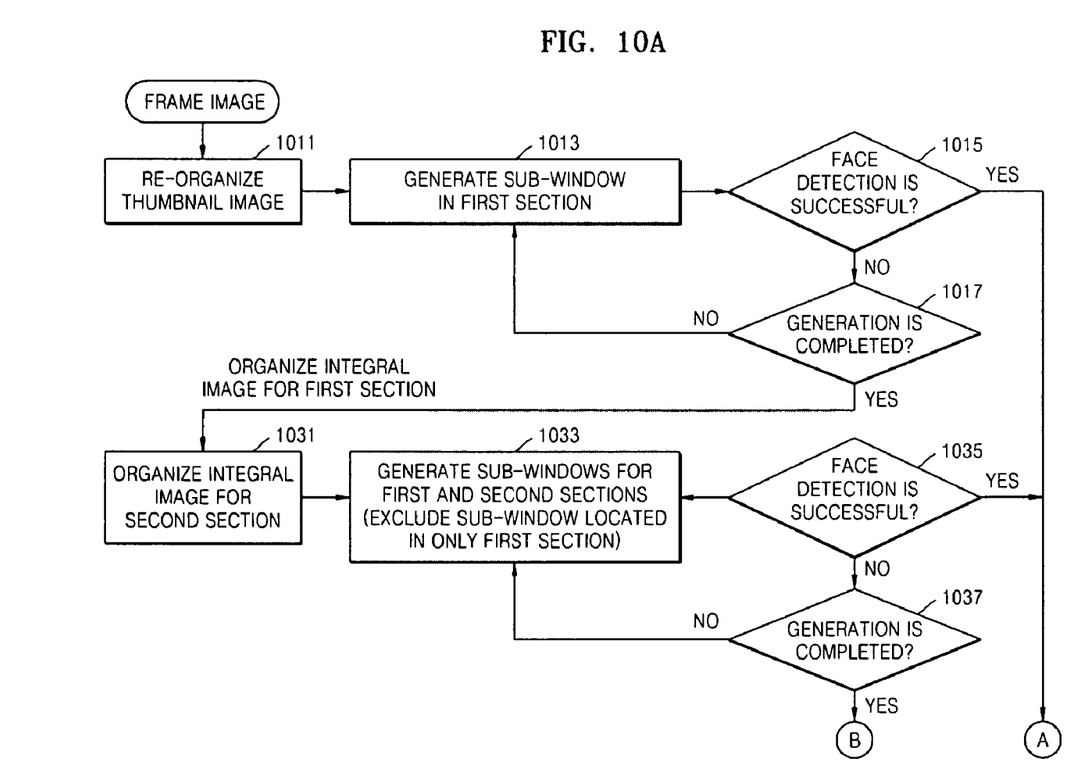
FIGS. 10A and 10B illustrate an operation of a face detection unit of a start-shot determination unit, such as that of FIG. 3, according to an embodiment of the present invention.
Figure 10B:
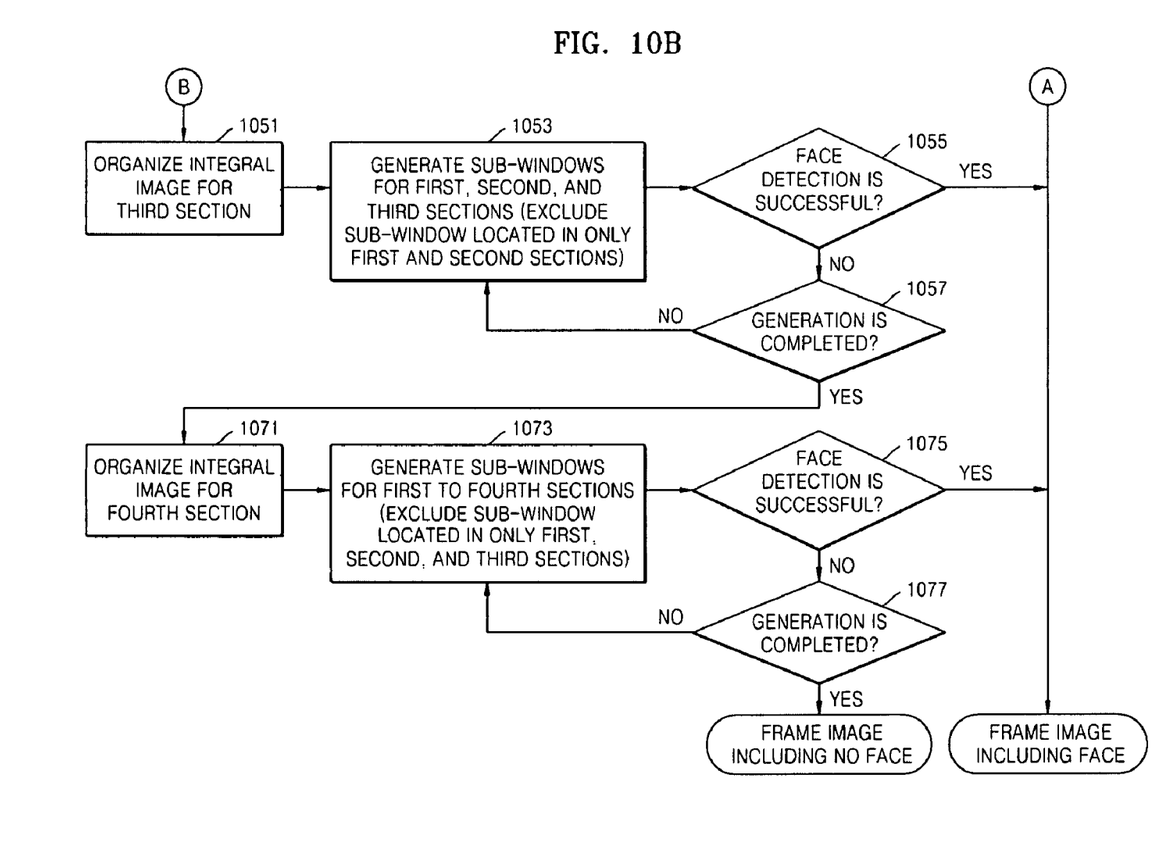

FIGS. 10A and 10B illustrate an operation of a face detection unit 330 of a start-shot determination unit 210, such as that of FIG. 3, according to an embodiment of the present invention.

Referring to FIGS. 10A and 10B, in operation 1011, the first section 910 is re-organized by creating an integral image of the first section 910. In operation 1013, a sub-window is generated from the integral image re-organized for the first section 910. In operation 1015, it is determined whether the face is successfully detected from the generated sub-window, and a frame image including the face is organized using the sub-window from which the face is successfully detected. In operation 1017, when the face is not successfully detected from the sub-window generated as a result of the determination of operation 1015, it is determined whether the generation of the sub-window for the first section 910 is completed. When the generation of the sub-window for the first section 910 is not completed, the process returns to operation 1013. Conversely, when the generation of the sub-window for the first section 910 is completed, the process advances to operation 1031.

In operation 1031, the second section 930 is re-organized by creating an integral image for the second section 930. In operation 1033, the sub-windows are generated from the integral images re-organized for the first and second sections 910 and 930. In this case, the sub-window located in only the first section 910 may be preferably excluded, for example. In operation 1035, it is determined whether the face is successfully detected from the generated sub-windows, and a frame image including the face is organized using the sub-window from which the face is successfully detected. In operation 1037, when the face is not successfully detected from the generated sub-windows as a result of the determination of operation 1035, it is determined whether the generation of the sub-windows for the first and second sections 910 and 930 is completed. When the generation of the sub-windows for the first and second sections 910 and 930 is not completed, the process returns to operation 1033. Conversely, when the generation of the sub-windows for the first and second sections 910 and 930 is completed, the process advances to operation 1051.

In operation 1051, the third section 950 is re-organized by creating an integral image for the third section 950. In operation 1053, the sub-windows are generated from the integral images re-organized for the first, second, and third sections 910, 930, and 950. In this case, the sub-windows located in only the first and second sections 910 and 930 may be preferably excluded, for example. In operation 1055, it is determined whether the face is successfully detected from the generated sub-windows, and a frame image including the face is organized using the sub-window from which the face is successfully detected. In operation 1057, when the face is not successfully detected from the generated sub-windows as a result of the determination of operation of 1055, it is determined whether the generation of the sub-windows for the first, second, and third sections 910, 930, and 950 is completed. When the generation of the sub-windows for the first, second, and third sections 910, 930, and 950 is not completed, the process returns to operation 1053. Conversely, when the generation of the sub-windows for the first, second, and third sections 910, 930, and 950 is completed, the process advances to operation 1071.

In operation 1071, the fourth section 970 is re-organized by creating an integral image for the fourth section 970. In operation 1073, the sub-windows are generated from the integral images re-organized for the first, second, third and fourth sections 910, 930, 950, and 970. In this case, the sub-window located in only the first, second and third sections 910, 930 and 950 may be preferably excluded, for example. In operation 1075, it is determined whether the face is successfully detected from the generated sub-windows, and a frame image including the face is organized using the sub-window from which the face is successfully detected. In operation 1077, when the face is not successfully detected from the generated sub-windows as a result of the determination of operation of 1075, it is determined whether the generation of the sub-windows for the first, second, third, and fourth sections 910, 930, 950, and 970 is completed. When the generation of the sub-windows for the first, second, third, and fourth sections 910, 930, 950, and 970 is not completed, the process returns to operation 1073. Conversely, when the generation of the sub-windows for the first, second, third, and fourth sections 910, 930, 950, and 970 is completed, the thumbnail image is determined as non-face frame image.

According to one embodiment, operations 1011, 1031, 1051, and 1071 may be performed in the thumbnail image re-organization unit 610, operations 1013, 1033, 1053, and 1073 may be performed in the sub-window generation unit 630, and operations 1015, 1017, 1035, 1037, 1055, 1057, 1075, and 1077 may be performed in the classifying unit 650.

Figure 11:
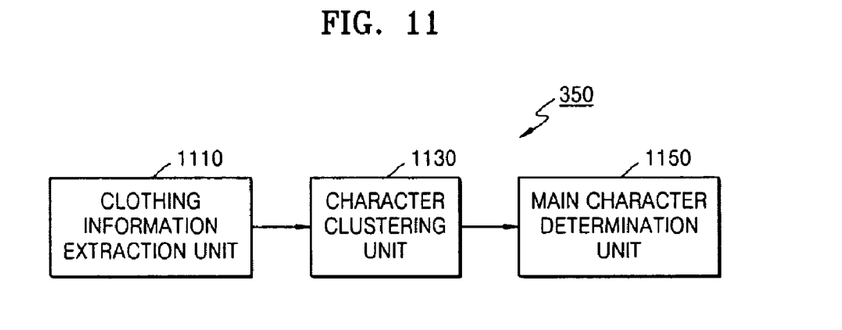
FIG. 11 illustrates a key-frame determination unit of a start-shot determination unit, such as that of FIG. 3, according to an embodiment of the present invention.

FIG. 11 illustrates a detailed make up of a key-frame determination unit 350 of a start-shot determination unit 210, such as that of FIG. 3, according to an embodiment of the present invention. The key-frame determination unit 350 may include a clothing information extraction unit 1110, a character clustering unit 1130, and a main character determination unit 1150, for example.

Figure 12:
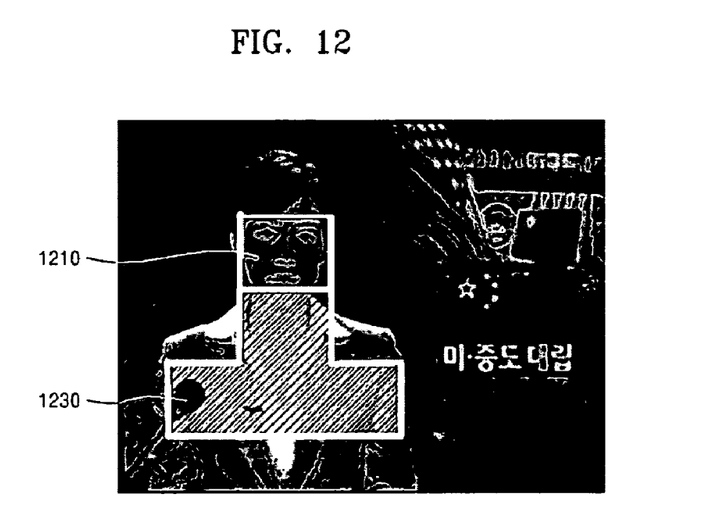
FIG. 12 illustrates an operation of a clothing information extraction unit, such as that of FIG. 11, according to an embodiment of the present invention.

Referring to FIG. 11, the clothing information extraction unit 1110 may extract clothing information, such as a clothing color histogram, for the frame images from which the face is detected in the face detection unit 330. In this case, the clothing color histograms may be extracted from a certain detection area 1230, for example, set based on the face region (1210 in FIG. 12) detected in the face detection unit 330. A reason for extracting the clothing color histograms is that a main character typically wears the same clothing throughout an entire video program.

The character clustering unit 1130 may receive the clothing color histograms, e.g., as extracted from the clothing information extraction unit 1110, and cluster the frame images from which the faces are detected to create a plurality of clusters. In this case, the frame images having the same clothing color histogram may be determined as the frame images having the same character.

The main character determination unit 1150 may select a cluster including the main character from a plurality of clusters, e.g., as provided by the character clustering unit 1130, corresponding to the number of main characters, e.g., as provided from the pre-processor unit 310. In this case, if there is only one main character, a cluster including the largest number of frame images may be selected. If there are a plurality of main characters, clusters may be selected in descending order from the largest to the smallest number of frame images, for example. The frame images included in the selected cluster or clusters make up a start-shot as a key-frame of each topic.

In addition to the above described embodiments, embodiments of the present invention can also be implemented through computer readable code/instructions in/on a medium, e.g., a computer readable medium. The medium can correspond to any tangible medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), for example. The media may also be a distributed network, so that the computer readable code is stored and executed in a distributed fashion.

As described above, in an apparatus, medium, and method segmenting a video program based on a topic, according to an embodiment of the present invention, a character-based high speed operation algorithm may be adopted to segment video frames based on a topic. Therefore, such a apparatus, medium, and method can be applied even to embedded systems such as mobile phones, personal digital assistants (PDAs), and digital cameras, which may have low performance processors.

In addition, an apparatus, medium, and method segmenting a video based on a topic, according to an embodiment of the present invention, can be applied to all kinds of video programs edited for a plurality of topics such as news, education, and society/culture genres, noting that these topics are referenced merely as examples and embodiments of the present invention should not be limited thereto.

Furthermore, an apparatus, medium, and method segmenting a video program based on a topic, according to an embodiment of the present invention, may be applied to various products such as blue-ray disc recorders and digital content management (DCM) home servers as well as embedded systems to increase user convenience, noting that such applications are also only examples and embodiments of the present invention should not be limited thereto.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus topic based segmenting a video program, the apparatus comprising:
    a start-shot determination unit to detect a plurality of key-frames based on character information from video sequences including a plurality of frames to determine the detected key-frames as start-shots for each topic; and
    a topic list creation unit including at least one processing device to create a topic list based on the start-shots for each topic,
    wherein the start-shot determination unit determines the detected key-frames corresponding to a total number of main characters appearing in the video sequences and the total number of main characters is determined by analyzing an electronic program guide (EPG) signal and character clustering.

2. The apparatus of claim 1, wherein the start-shot determination unit detects key-frames based on clothing information of at least one main character.

3. The apparatus of claim 1, wherein the topic list creation unit organizes frames existing between a current topic start-shot and a next topic start-shot into a current topic episode, and adds the current topic episode to the start-shot of each topic in the topic list.

4. The apparatus of claim 1, wherein the start-shot determination unit comprises:
    a pre-processing unit to determine frames belonging to a respective scene by detecting scene change among frames included in the video sequences and to obtain the total number of main characters appearing in the video sequences;
    a face detection unit to detect faces from the determined frames belonging to the respective scene to determine face detection frames; and
    a key-frame determination unit to cluster the determined face detection frames according to the main characters corresponding to the total number of main characters to determine the key-frames.

5. The apparatus of claim 4, wherein the pre-processing unit detects the scene change by calculating similarity between a current frame and a previous frame.

6. The apparatus of claim 4, wherein the pre-processing unit obtains the total number of main characters from the electronic program guide (EPG) signal.

7. The apparatus of claim 4, wherein the pre-processing unit comprises:
    a thumbnail image creation unit to create thumbnail images for input frames;
    a scene change detection unit to detect the scene change using similarity of color histograms between thumbnail images of neighboring frames; and
    a number-of-main-characters determination unit to determine the total number of main characters by analyzing the EPG signal.

8. The apparatus of claim 4, wherein the face detection unit comprises:
    a thumbnail image re-organization unit to create an integral image for thumbnail images of input frames and to re-organize the thumbnail images using the integral image;
    a sub-window generation unit to generate a sub-window within the re-organized thumbnail images; and
    a classifying unit to determining whether the sub-window includes a face.

9. The apparatus of claim 8, wherein the face detection unit divides the thumbnail images of the input frames into a plurality of sections comprising a section having a highest probability of detecting the face, and sequentially provides the plurality of sections to the thumbnail image re-organization unit in descending order from the section having the highest probability of detecting the face to a section having a lowest probability of detecting the face.

10. The apparatus of claim 4, wherein the key-frame determination unit comprises:
    a clothing information extraction unit to extract clothing information from a face detection frame;
    a character clustering unit to perform a character clustering method based on the extracted clothing information; and
    a main character determination unit to select a cluster corresponding to the main character from a plurality of clusters, clustered in the character clustering unit, corresponding to the total number of main characters and to provide frames included in the selected cluster as key-frames of each topic.

11. The apparatus of claim 10, wherein the clothing information comprises a clothing color histogram.

12. A method of topic based segmenting of video sequences, the method comprising:
    detecting, using at least one processing device, a plurality of key-frames based on character information from video sequences including a plurality of frames to determine the detected key-frames as start-shots for each topic; and
    creating a topic list based on the start-shots for each topic,
    wherein the determination of the start-shots determines the detected key-frames corresponding to a total number of main characters appearing in the video sequences and the total number of main characters is determined by analyzing an electronic program guide (EPG) signal and character clustering.

13. The method of claim 12, wherein the determination of the start-shots includes detecting key-frames based on clothing information of at least one main character.

14. The method of claim 12, wherein the creation of the topic list organizes frames existing between a current topic start-shot and a next topic start-shot into a current topic episode, and adds the current topic episode to the start-shot of each topic in the topic list.

15. The method of claim 12, wherein the determination of the start-shots comprises:
    detecting a scene change from the frames included in the video sequences to determine frames belonging to a respective scene and obtaining the total number of main characters appearing in the video sequences;

detecting faces from the determined frames belonging to the respective scene to determine face detection frames; and clustering the determined face detection frames according to the main characters corresponding to the total number of main characters to determine the face detection frames as key-frames.

16. The method of claim 15, wherein the scene change is detected by creating thumbnail images of input frames and using similarity of color histograms between thumbnail images of neighboring frames.

17. The method of claim 15, wherein the total number of main characters is obtained by analyzing the electronic program guide (EPG) signal.

18. The method of claim 15, wherein the detection of the faces comprises:

creating an integral image for thumbnail images of input frames and re-organizing the thumbnail images using the integral image;

generating a sub-window within the re-organized thumbnail images; and determining whether the sub-window comprises a face.

19. The method of claim 18, wherein the detection of the faces further comprises dividing the thumbnail images of the input frames into a plurality of sections comprising a section having a highest probability of detecting a face, and sequentially providing the thumbnail images for the thumbnail image re-organizing in descending order from the section having the highest probability of detecting the face to a section having a lowest probability of detecting the face.

20. The method of claim 15, wherein the determination of the key-frames comprises:

extracting clothing information from the face detection frames;

performing a character clustering method based on the extracted clothing information; and selecting a cluster corresponding to the main character from a plurality of clusters corresponding to the total number of main characters and providing frames included in the selected cluster as the key-frames of each topic.

21. A non-transitory computer readable storage medium comprising computer readable code to control at least one processing device to implement the method of claim 12.

* * * * *